United States Patent
Chang et al.

(10) Patent No.: US 7,328,159 B2
(45) Date of Patent: Feb. 5, 2008

(54) INTERACTIVE SPEECH RECOGNITION APPARATUS AND METHOD WITH CONDITIONED VOICE PROMPTS

(75) Inventors: Chienchung Chang, Rancho Santa Fe, CA (US); Narendranath Malayath, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 1355 days.

(21) Appl. No.: 10/050,378

(22) Filed: Jan. 15, 2002

(65) Prior Publication Data

US 2003/0135371 A1 Jul. 17, 2003

(51) Int. Cl.
*G10L 21/00* (2006.01)
*G10L 15/20* (2006.01)
*G10L 13/00* (2006.01)

(52) U.S. Cl. .................. 704/275; 704/233; 704/258; 704/266; 704/268

(58) Field of Classification Search .............. 704/200, 704/231, 233, 258, 260, 275, 250; 379/88.16
See application file for complete search history.

(56) References Cited

U.S. PATENT DOCUMENTS 5,155,760 A * 10/1992 Johnson et al. .......... 379/88.01
5,475,791 A * 12/1995 Schalk et al. ............. 704/233
6,061,651 A * 5/2000 Nguyen .................. 704/233
6,760,699 B1 * 7/2004 Weerackody et al. ...... 704/233

FOREIGN PATENT DOCUMENTS

WO WO98/24225 * 6/1998

* cited by examiner

*Primary Examiner*—Richemond Dorvil
*Assistant Examiner*—V. Paul Harper
(74) *Attorney, Agent, or Firm*—Philip R. Wedsworth; Charles D. Brown; George C. Poppas

(57) ABSTRACT

An improved system for an interactive voice recognition system (400) includes a voice prompt generator (401) for generating voice prompt in a first frequency band (501). A speech detector (406) detects presence of speech energy in a second frequency band (502). The first and second frequency bands (501, 502) are essentially conjugate frequency bands. A voice data generator (412) generates voice data based on an output of the voice prompt generator (401) and audible speech of a voice response generator (402). A control signal (422) controls the voice prompt generator (401) based on whether the speech detector (406) detects presence of speech energy in the second frequency band (502). A back end (405) of the interactive voice recognition system (400) is configured to operate on an extracted front end voice feature based on whether the speech detector (406) detects presence of speech energy in the second frequency band (502).

21 Claims, 5 Drawing Sheets

VOICE RECOGNITION SECTIONS

INTERACTIVE SPEECH RECOGNITION APPARATUS AND METHOD WITH CONDITIONED VOICE PROMPTS

BACKGROUND

1. Field of the Invention

The disclosed embodiments relate to the field of voice recognition, and more particularly, to voice recognition in a wireless communication system.

2. Background

Voice recognition (VR) technology, generally, is known and has been used in many different devices. A VR system may operate in an interactive environment. In such a system, the user may respond with an audio response, such as a voice response, to an audio prompt, such as a voice prompt, from a device. Referring to FIG. 1, generally, the functionality of VR may be performed by two partitioned sections such as a front-end section 101 and a back-end section 102. An input 103 at front-end section 101 receives voice data. A microphone (not shown) may originally generate the voice data. The microphone through its associated hardware and software converts the audible voice input information into voice data. Front-end section 101 examines the short-term spectral properties of the input voice data, and extracts certain front-end voice features, or front-end features, that are possibly recognizable by back-end section 102.

Back-end section 102 receives the extracted front-end features at an input 105, a set of grammar definitions at an input 104 and acoustic models at an input 106. Grammar input 104 provides information about a set of words and phrases in a format that may be used by back-end section 102 to create a set of hypotheses about recognition of one or more words. Acoustic models at input 106 provide information about certain acoustic models of the person speaking into the microphone. A training process normally creates the acoustic models. The user may have to speak several words or phrases for creating his or her acoustic models.

Generally, back-end section 102 compares the extracted front-end features with the information received at grammar input 104 to create a list of words with an associated probability. The associated probability indicates the probability that the input voice data contains a specific word. A controller (not shown), after receiving one or more hypotheses of words, selects one of the words, most likely the word with the highest associated probability, as the word contained in the input voice data. The system of back end 102 may reside in a microprocessor. The recognized word is processed as an input to the device to perform or respond in a manner consistent with the recognized word.

In the interactive VR environment, a user may provide a voice response to a voice prompt from a device. The voice prompt from the device may last for a period of time. While the voice prompt is playing by a speaker (not shown), the user may provide the voice response through a microphone (not shown). As a result, the input voice data 103, as picked up by the microphone, is a combination of the voice prompt and the user voice response. Therefore, the input voice data 103 may include a more complex set of voice features than the user voice input alone. When the user voice features are mixed with other voice features, the task of extracting the user voice features is more difficult. Therefore, it is desirable to have an improved interactive VR system.

SUMMARY

Generally stated, a method and an accompanying apparatus provides for an improved interactive voice recognition system. The improved system for an interactive voice recognition system includes a voice prompt generator for generating voice prompt in a first frequency band. A speech detector detects presence of speech energy in a second frequency band. The first and second frequency bands are essentially conjugate frequency bands. A voice data generator generates voice data based on an output of the voice prompt generator and audible speech of a voice response generator. A control signal controls the voice prompt generator based on whether the speech detector detects presence of speech energy in the second frequency band. A back end of the interactive voice recognition system is configured to operate on an extracted front end voice feature based on whether the speech detector detects presence of speech energy in the second frequency band. The first and second frequency bands include a plurality of conjugate frequency bands.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION OF THE PREFERRED EMBODIMENT

Figure 1:
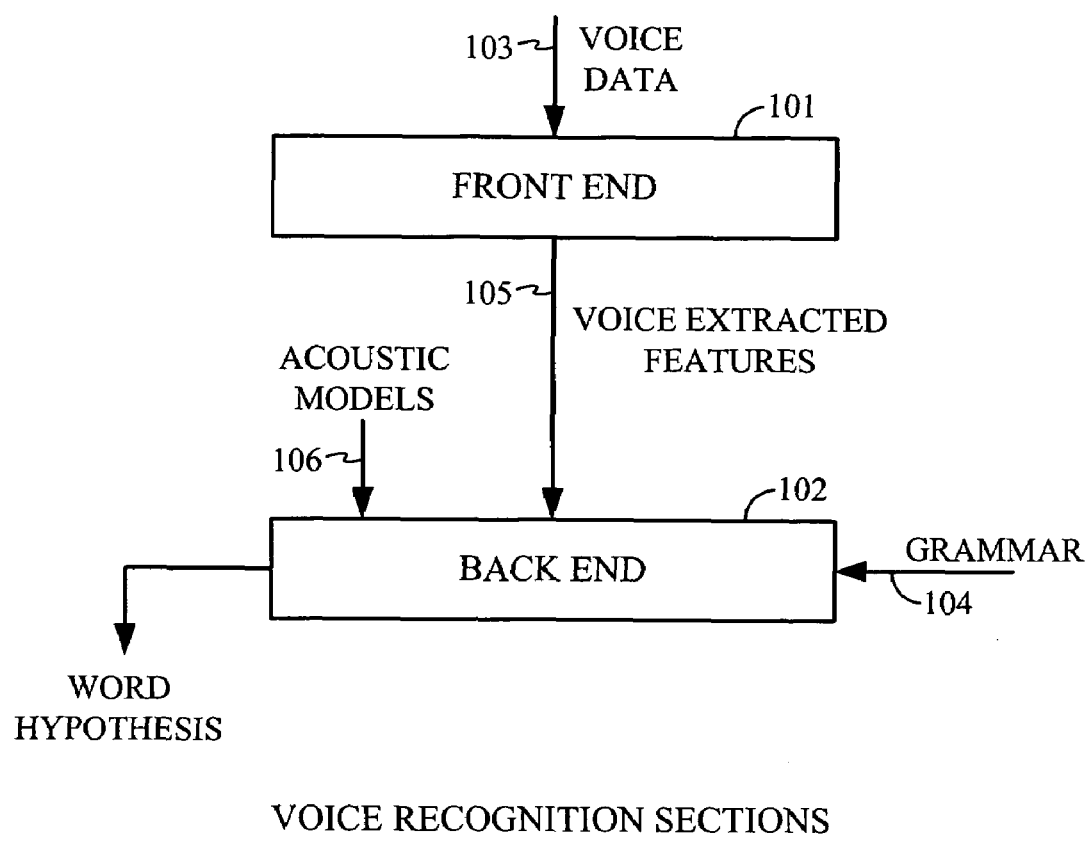
FIG. 1 illustrates partitioning functionality of a voice recognition system to two partitioned sections such as a front-end section and a back-end section.

Generally stated, a novel and improved method and apparatus provide for a voice recognition (VR) system with a speech detector for detecting voice response from a user. The speech detector mutes or lowers the volume of a voice prompt played by a device after detecting the voice prompt from the user. The back end processing of the voice response in the VR system is simplified when the input voice data includes mostly the voice data generated by the user. The device may be a remote device such as a cellular phone or any other similarly operated device. Therefore, the exemplary embodiments described herein are set forth in the context of a digital communication system. While use within this context is advantageous, different embodiments of the invention may be incorporated in different environments or configurations. In general, various systems described herein may be formed using software-controlled processors, integrated circuits, or discrete logic. The data, instructions, commands, information, signals, symbols, and chips that may be referenced throughout are advantageously represented by voltages, currents, electromagnetic waves, magnetic fields or particles, optical fields or particles, or a combination thereof. In addition, the blocks shown in each block diagram may represent hardware or method steps.

The remote device in the communication system may decide and control the portions of the VR processing that may take place at the remote device and the portions that may take place at a base station. The base station may be in wireless communication with the remote device. The remote device may be a cellular phone, a personal digital assistant (PDA) device, or any other device capable of having a wireless communication with a base station. The remote device may establish a wireless connection for communication of data between the remote device and the base station. The base station may be connected to a network. The portion of the VR processing taking place at the base station may be routed to a VR server connected to the base station via the network. The remote device may have incorporated a commonly known micro-browser for browsing various web sites on the Internet to receive or transmit data.

The wireless connection may be used to receive front end configuration data. The configuration data indicates mainly filtering, audio processing, etc, required to be performed by the front end processing for extracting the front end features. The front end configuration data, therefore, corresponds to the type and design of the back end portion. The front end configuration data is used to configure the front portion to operate correspondingly with the back end portion. The remote device may request for the configuration data, and receive the configuration data in response.

The remote device may perform a VR front-end processing on the received voice data to produce extracted voice features of the received voice data in accordance with a programmed configuration corresponding to the design of the back end portion. The remote device through its microphone receives the user voice data. The microphone coupled to the remote device takes the user input voice, and converts the input into voice data. After receiving the voice data, and after configuring the front end portion, certain voice features in accordance with the configuration are extracted. The extracted features are passed on to the back end portion for VR processing.

For example, the user voice data may include a command to find the weather condition in a known city, such as Boston. The display on the remote device through its micro-browser may show "Stock Quotes|Weather|Restaurants|Digit Dialing|Nametag Dialing|Edit Phonebook" as the available choices. The user interface logic in accordance with the content of the web browser allows the user to speak the key word "Weather", or the user can highlight the choice "Weather" on the display by pressing a key. The remote device may be monitoring for the user voice data and the keypad input data for commands to determine that the user has chosen "weather." Once the device determines that the weather has been selected, it then prompts the user on the screen by showing "Which city?" or speaks "Which city?". The user then responds by speaking or using keypad entry. The user may begin to speak the response while the prompt is being played. In such a situation, the input voice data, in addition to the user input voice data, includes voice data generated by the voice prompt, in a form of feed back to the microphone from the speaker of the device. If the user speaks "Boston, Mass.", the remote device passes the user voice data to the VR processing section to interpret the input correctly as a name of a city. In return, the remote device connects the micro-browser to a weather server on the Internet. The remote device downloads the weather information onto the device, and displays the information on a screen of the device or returns the information via audible tones through the speaker of the remote device. To speak the weather condition, the remote device may use text-to-speech generation processing. The back end processings of the VR system may take place at the device or at VR server connected to the network.

Figure 2:
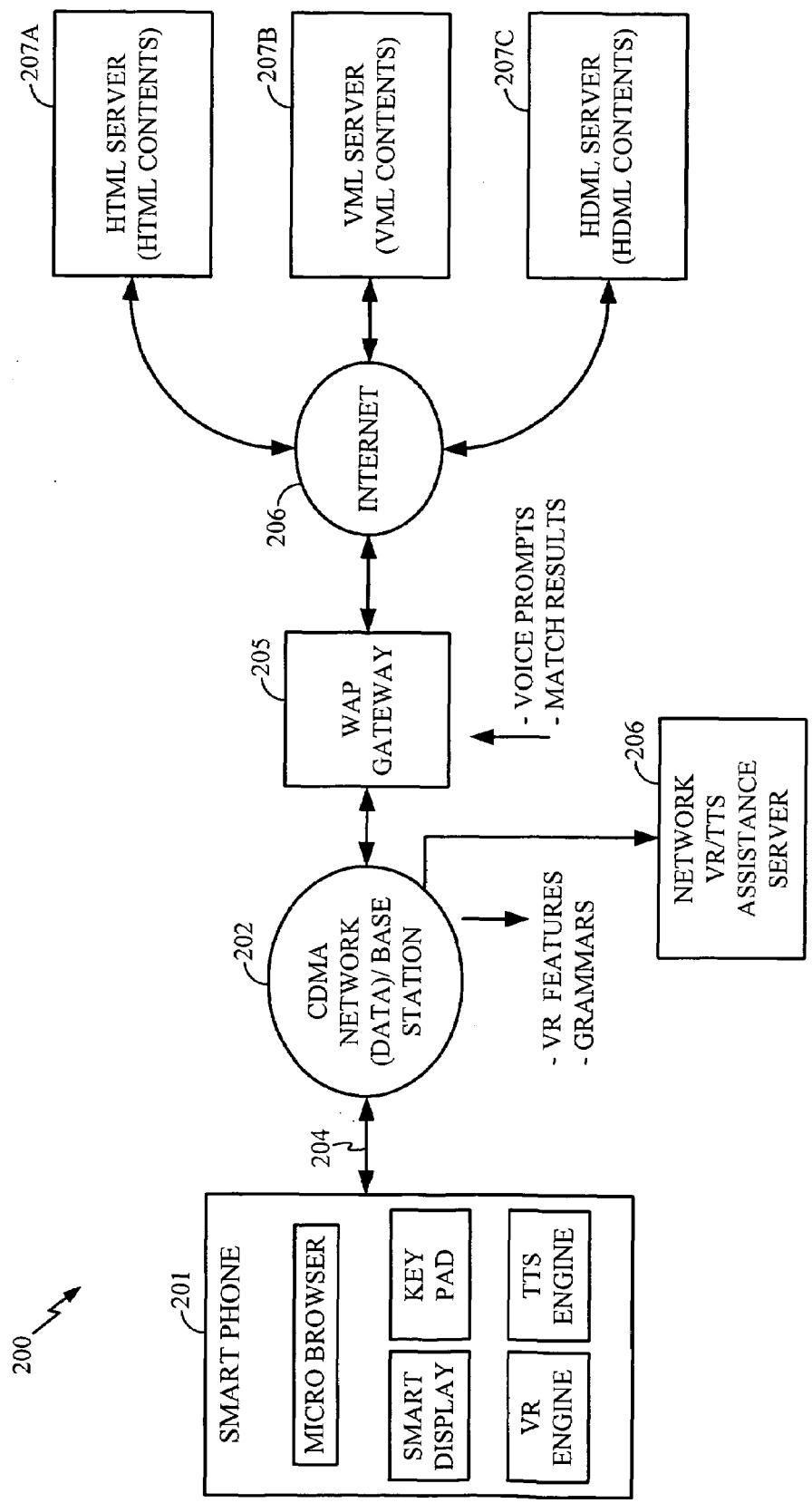
FIG. 2 depicts a block diagram of a communication system incorporating various aspects of the disclosed embodiments.

In one or more instances, the remote device may have the capacity to perform a portion of the back-end processing. The back end processing may also reside entirely on the remote device. Various aspects of the disclosed embodiments may be more apparent by referring to FIG. 2. FIG. 2 depicts a block diagram of a communication system 200. Communication system 200 may include many different remote devices, even though one remote device 201 is shown. Remote device 201 may be a cellular phone, a laptop computer, a PDA, etc. The communication system 200 may also have many base stations connected in a configuration to provide communication services to a large number of remote devices over a wide geographical area. At least one of the base stations, shown as base station 202, is adapted for wireless communication with the remote devices including remote device 201. A wireless communication link 204 is provided for communicating with the remote device 201. A wireless access protocol gateway 205 is in communication with base station 202 for directly receiving and transmitting content data to base station 202. The gateway 205 may, in the alternative, use other protocols that accomplish the same or similar functions. A file or a set of files may specify the visual display, speaker audio output, allowed keypad entries and allowed spoken commands (as a grammar). Based on the keypad entries and spoken commands, the remote device displays appropriate output and generates appropriate audio output. The content may be written in markup language commonly known as XML HTML or other variants. The content may drive an application on the remote device. In wireless web services, the content may be up-loaded or down-loaded onto the device, when the user accesses a web site with the appropriate Internet address. A network commonly known as Internet 206 provides a land-based link to a number of different servers 207A–C for communicating the content data. The wireless communication link 204 is used to communicate the data to the remote device 201.

In addition, in accordance with an embodiment, a network VR server 208 in communication with base station 202 directly may receive and transmit data exclusively related to VR processing. Server 208 may perform the back-end VR processing as requested by remote device 201. Server 208 may be a dedicated server to perform back-end VR processing. An application program user interface (API) provides an easy mechanism to enable applications for VR running on the remote device. Allowing back-end processing at the sever 208 as controlled by remote device 201 extends the capabilities of the VR API for being accurate, and performing complex grammars, larger vocabularies, and wide dialog functions. This may be accomplished by utilizing the technology and resources on the network as described in various embodiments.

A correction to a result of back end VR processing performed at VR server 208 may be performed by the remote device, and communicated quickly to advance the application of the content data. If the network, in the case of the cited example, returns "Bombay" as the selected city, the user may make correction by repeating the word "Boston." The word "Bombay" may be in an audio response by the device. The user may speak the word "Boston" before the audio response by the device is completed. The input voice data in such a situation includes the names of two cities, which may be very confusing for the back end processing. However, the back end processing in this correction response may take place on the remote device without the help of the network. In alternative, the back end processing may be performed entirely on the remote device without the network involvement. For example, some commands (such as spoken command "STOP" or keypad entry "END") may have their back end processing performed on the remote device. In this case, there is no need to use the network for the back end VR processing; therefore, the remote device performs the front end and back end VR processings. As a result, the front end and back end VR processings at various times during a session may be performed at a common location or distributed.

Figure 3:
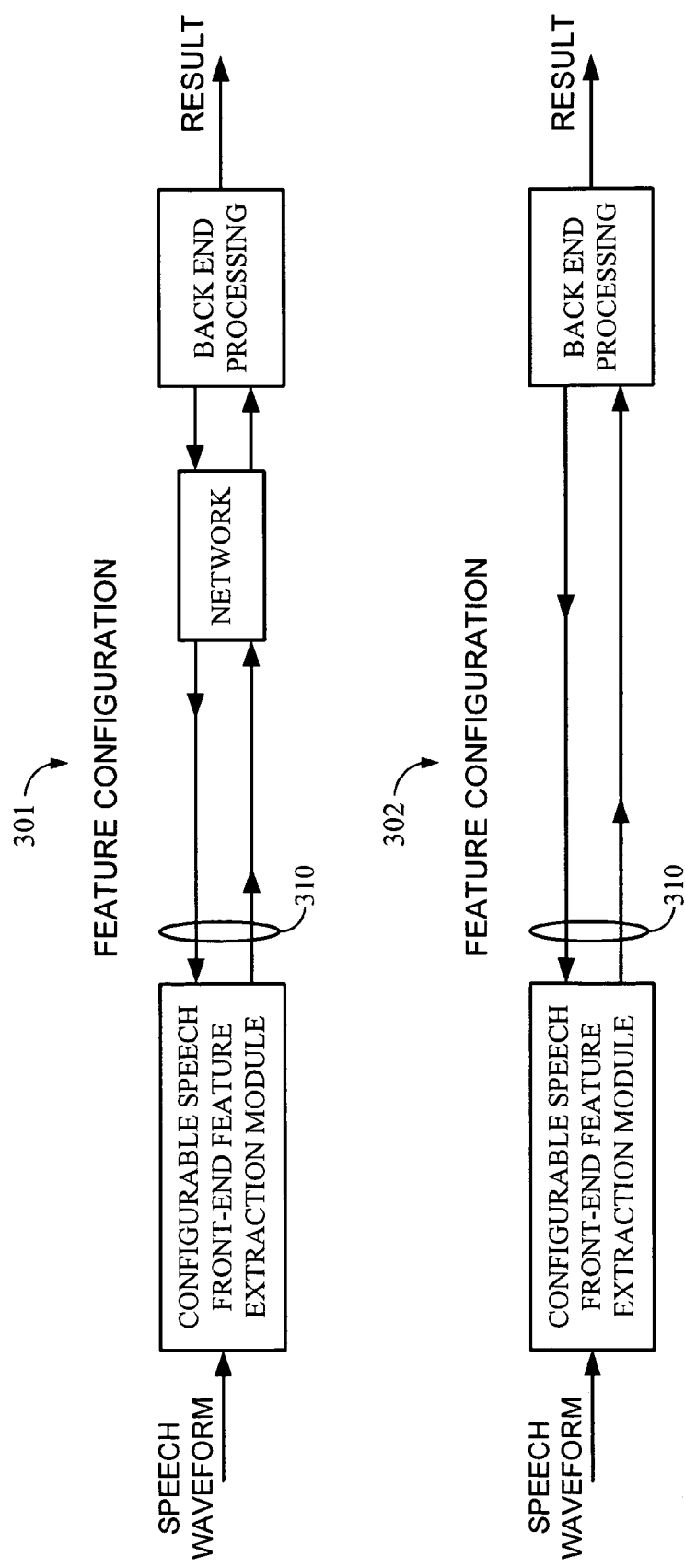
FIG. 3 illustrates partitioning of a voice recognition system in accordance with a co-located voice recognition system and a distributed voice recognition system.

Referring to FIG. 3, a general flow of information between various functional blocks of a VR system 300 is shown. A distributed flow 301 may be used for the VR processing when the back end processing and front end processings are distributed. A co-located flow 302 may be used when the back end and front end processings are co-located. In the distributed flow 301, the front end may obtain a configuration file from the network. The content of the configuration file allows the front end to configure various internal functioning blocks to perform the front end feature extraction in accordance with the design of the back end processing. The co-located flow 302 may be used for obtaining the configuration file directly from the back end processing block. The communication link 310 may be used for passing the voice data information and associated responses. The co-located flow 302 and distributed flow 301 may be used by the same device at different times during a VR processing session.

Figure 4:
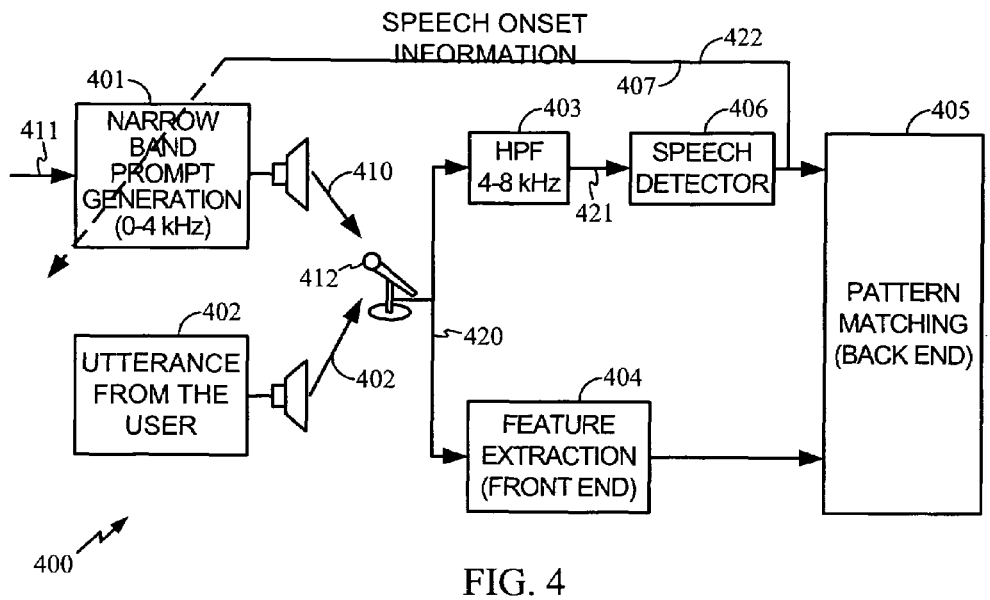
FIG. 4 illustrates various blocks of a voice recognition system in accordance with various aspects of the invention.

Referring to FIG. 4, a block diagram 400 of a VR system in accordance with various aspects of the invention is shown. A user may utter a voice response 402 to be received by a microphone 412. The microphone 412 converts the input voice to input voice data 420. The input voice data 420 is passed on to a front end section 404 for extracting the front end voice features. The extracted voice features are passed on to the back end section 405 for matching a voice pattern in accordance with the back end operation described herein. The input voice data 420 may also include voice data of voice prompt 410 generated by a prompt generator block 401.

The voice prompt generator block 401 may generate the voice prompt 410 in response to a control signal 411. The control signal 411 may be generated by a microprocessor (not shown.) In accordance with various embodiments of the invention, a filter 403 also receives the input voice data 420. The filter 403 filters the input voice data 420 in accordance with a filtering frequency band. For example, in an embodiment, the filter 403 may be limited to a band pass filter between 4 and 8 KHz. The filtered input voice data 421 is generated. A speech detector 406 receives the filtered voice data 421. The speech detector 406 may include a comparator for comparing the signal energy of the filtered voice data 421 to a threshold. An operational amplifier may be used. In alternative or in combination, digital circuitry may also be employed. When the filtered input voice data 421 meets the threshold, the speech detector 406 indicates presence of a person's voice data and generates a control signal 422.

The control signal 422 controls the voice prompt generator 401 in accordance with various embodiments of the invention. Control signal 422 mutes or lowers the volume of the voice prompt generated by the voice prompt generator 401. At the same time, control signal 422 controls the operation of the back end section 405 in accordance with various embodiments of the invention. When presence of a person's voice data is detected, back end section 405 begins to perform the back end processing of the extracted voice features. Processing the extracted voice features is not necessary when the input voice data 420 does not include a person's voice data. Alternatively or in combination, processing of the extracted voice features may continue if there is an appropriate rejection scheme of unnecessary processing in the VR system. Control signal 422 may be used to assist such a rejection scheme in the VR system. As such, the back end section 405 performs back end processing when necessary based on an indication made by the control signal 422. At the same time, the voice data 420 may be limited to voice data generated by the voice response 402 based on the control signal 422 controlling various aspects of voice prompt generator 401. As a result, the process at the back end section 405 is relatively simplified and thus the voice recognition accuracy is enhanced.

Figure 5:
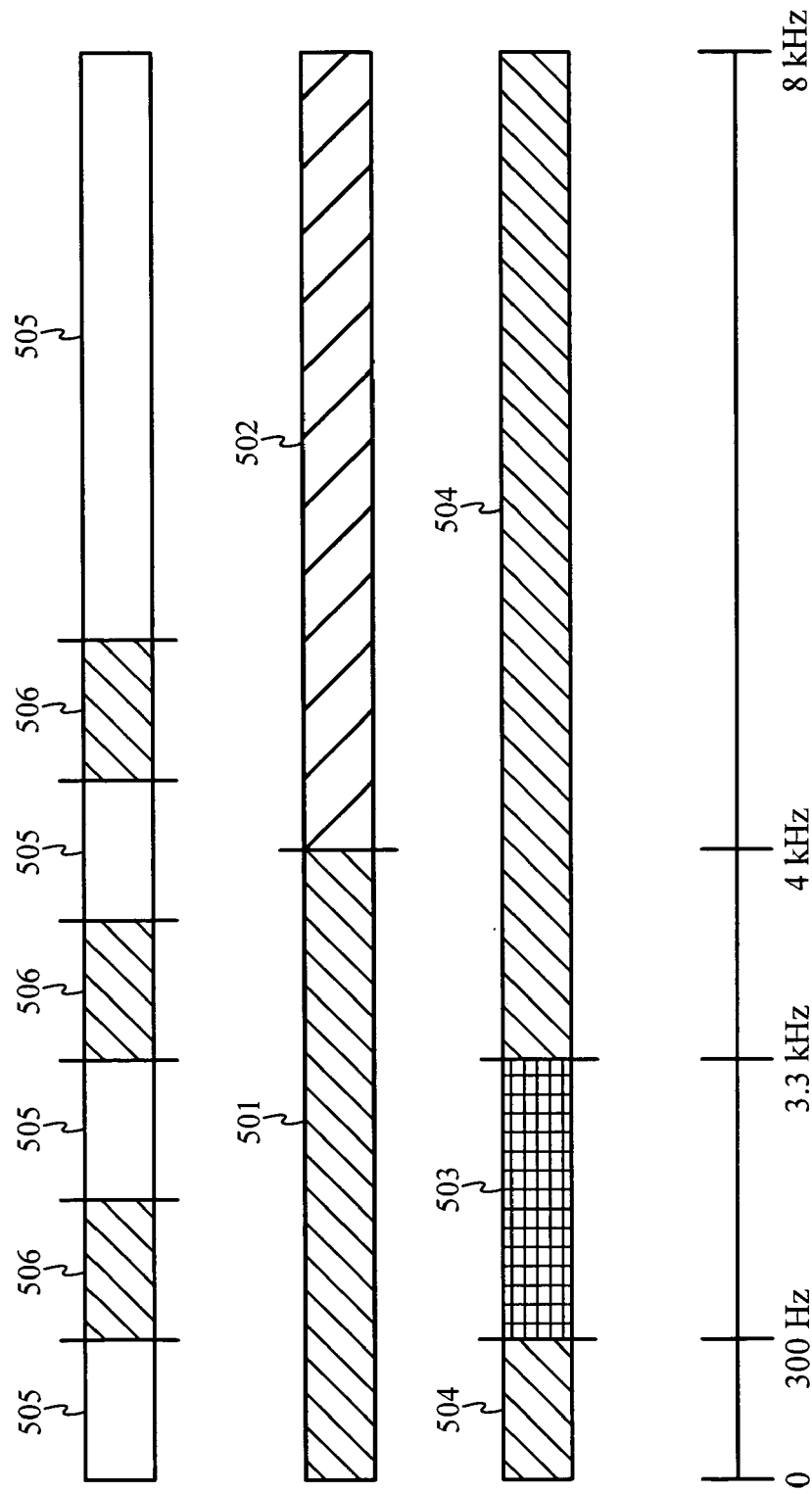
FIG. 5 illustrates various conjugate frequency bands used for a voice prompt generator and speech detection filters in accordance with various aspects of the invention.

Referring to FIG. 5, various frequency bands for operating the voice prompt generator 401 and filter 403 are shown. Generally, voice data is limited to a frequency band from near zero to eight thousands Hertz. However, voice data is still intelligible by human ears when the voice data is limited to a frequency band less than zero to eight thousands Hertz. In one embodiment, the frequency band of the voice prompt 410 may be limited to frequency band 501. Frequency band 501 is from zero to four KHz. The frequency band of filter 403 for filtering the voice prompt 410 is then limited to frequency band 502 which is 4 to 8 KHz. In such an embodiment, filter 403 filters the components generated by voice prompt 410 in the voice data 420. In another embodiment, the frequency band of the voice prompt 410 may be limited to frequency band 503. Frequency band 503 is from 300 Hz to 3.3 KHz. The frequency band of filter 403 for filtering the voice prompt 410 is then limited to frequency band 504 which is conjugate to frequency band 503 within the audible frequency band (i.e. 8 KHz.) In such an embodiment, filter 403 filters the components generated by voice prompt 410 in the voice data 420. In another embodiment, the frequency band of the voice prompt 410 may be limited to frequency band 506. Frequency band 506 may be formed by several smaller bands at various frequencies. The frequency band of filter 403 for filtering the voice prompt 410 is then limited to frequency band 505 which is conjugate to frequency band 506 within the audible frequency band (i.e. 8 KHz.) In such an embodiment, filter 403 filters the components generated by voice prompt 410 in the voice data 420. Use of low pass, high pass, band pass and comb filter may be appropriate in one or more embodiments.

Figure 6:
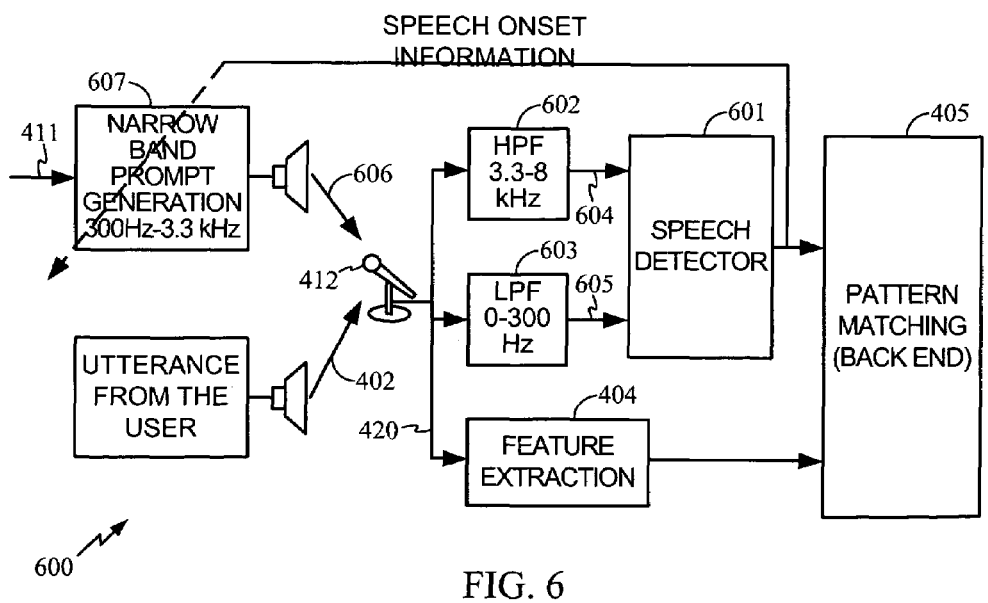
FIG. 6 illustrates various blocks of a voice recognition system in accordance with various aspects of the invention.

Referring to FIG. 6, use of several filters 602–603 may be necessary in accordance with various embodiments of the invention as shown in block diagram 600 of a VR system. Each filter 602–603 may filter the voice data 420 at different frequency bands. Accordingly, several filtered outputs 604–605 are produced. The filtered outputs 604–605 are input to speech detector 601. Speech detector 601 uses several filtered outputs 604–605 to determine if a person's voice data is present in the voice data 420. Several comparators may correspondingly be used with several different thresholds. For example, for frequency band 0–300 Hz, the filtered voice data may produce a low output in comparison to the high frequency output in the frequency band 3.3–8 KHz. Therefore, the threshold for detection of a person's voice activity in one frequency band may be different than the other. The voice prompt generator 607 generates the voice prompt 606 within a frequency band that is conjugate of the frequency band used in filters 602–603.

A change in configuration of the filters 403 and 602–603 and voice prompt generator 401 and 607, shown in block diagrams 400 and 600, may take place at any time. For example, the remote device 201 may be used in accordance with a hands free operation in a car. In this case, the processing of voice data in the car may require certain unique frequency band. After detecting that the remote device 201 is being used in such an environment, the configuration of one or more the filters 403 and 602–603 and voice prompt generator 401 and 607, shown in block diagrams 400 and 600, are loaded for operation in the car environment. The remote device 201 may be removed from the car. At this time, once the new environment is detected, a new configuration of the filters 403 and 602–603 and voice prompt generator 401 and 607, shown in block diagrams 400 and 600, may be loaded. The remote device 201 or the network may keep track of the configuration loaded in the filters 403 and 602–603 and voice prompt generator 401 and 607, shown in block diagrams 400 and 600. After the network or the remote device 201 detects the need for a new configuration, the new configuration is requested and loaded in the filters 403 and 602–603 and voice prompt generator 401 and 607, shown in block diagrams 400 and 600, to operate in the new environment.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty.

What is claimed is:

1. A system for an interactive voice recognition system, comprising:
   a voice prompt generator configured for generating voice prompt in a first frequency band;
   a speech detector configured for detecting presence of speech energy in a second frequency band, wherein said first and second frequency bands are essentially conjugate frequency bands selected from a plurality of conjugate frequency and sets based at least in part on an operating mode of the system.

2. The system as recited in claim 1 further comprising:
   a voice data generator for generating voice data based on an output of said voice prompt generator and audible speech of a voice response generator.

3. The system as recited in claim 1 further comprising:
   a control signal for controlling said voice prompt generator based on whether said speech detector detects presence of speech energy in said second frequency band.

4. The system as recited in claim 1 further comprising:
   a back end of said interactive voice recognition system configured to operate on an extracted front end voice feature based on whether said speech detector detects presence of speech energy in said second frequency band.

5. The system as recited in claim 1 wherein said first and second frequency bands include a plurality of conjugate frequency bands.

6. A method for an interactive voice recognition system, comprising:
   selecting a conjugate frequency band set from a plurality of conjugate frequency band sets based at least in part on an operating mode;
   filtering output of a voice prompt generator in accordance with a first frequency band;
   controlling said output of said voice prompt generator based on detection of a presence of speech energy in a second frequency band, wherein said first and second frequency bands are essentially conjugate frequency bands corresponding to the selected conjugate frequency band set.

7. The method as recited in claim 6 further comprising:
   operating a back end of said interactive voice recognition system based on said detection of said presence of speech energy in said second frequency band.

8. The method as recited in claim 6 further comprising:
   generating voice data based on an output of said voice prompt generator and audible speech of a voice response generator, wherein said detection of said presence of speech energy in said second frequency band is based on processing of said voice data.

9. The method as recited in claim 6 wherein said first and second frequency bands include a plurality of conjugate frequency bands.

10. A microprocessor system for an interactive voice recognition system for operation in a remote device, comprising:
    means for a voice prompt generator configured for generating voice prompt in a first frequency band;
    means for a speech detector configured for detecting presence of speech energy in a second frequency band, wherein said first and second frequency bands are essentially conjugate frequency bands selected from a plurality of conjugate frequency band sets based at least in part on an operating mode of the system.

11. The microprocessor system as recited in claim 10 further comprising:
    means for a voice data generator for generating voice data based on an output of said voice prompt generator and audible speech of a voice response generator.

12. The microprocessor system as recited in claim 10 further comprising:
    means for generating a control signal for controlling said voice prompt generator based on whether said speech detector detects presence of speech energy in said second frequency band.

13. The microprocessor system as recited in claim 10 further comprising:
    means for a back end of said interactive voice recognition system configured to operate on an extracted front end voice feature based on whether said speech detector detects presence of speech energy in said second frequency band.

14. The microprocessor system as recited in claim 10 wherein said first and second frequency bands include a plurality of conjugate frequency bands.

15. A microprocessor system configured for an interactive voice recognition system, comprising:
    means for filtering output of a voice prompt generator in accordance with a first frequency band;
    means for controlling said output of said voice generator based on detection of a presence of speech energy in a second frequency band, wherein said first and second frequency bands are essentially conjugate frequency bands selected from a plurality of conjugate frequency band sets based at least in an operating mode of the system.

16. The microprocessor system as recited in claim 15 further comprising:
  means for operating a back end of said interactive voice recognition system based on said detection of said presence of speech energy in said second frequency band.

17. The microprocessor system as recited in claim 15 further comprising:
  means for generating voice data based on an output of said voice prompt generator and audible speech oh voice response generator, wherein said detection of said presence of energy in said second frequency band is based on processing of said voice data.

18. The microprocessor system as recited in claim 15 wherein said first and second frequency bands include a plurality of conjugate frequency bands.

19. A remote device for providing remote communication and interactive voice recognition, comprising:
  a voice prompt generator configured for generating voice prompt in a first frequency band;
  a speech detector configured for detecting presence of speech energy in a second frequency band, wherein said first and second frequency bands are essentially conjugate frequency bands selected from a plurality of conjugate frequency band sets based at least in part on an operating mode of the remote device;
  a voice data generator for generating voice data based on an output of said voice prompt generator and audible speech of a voice response generator;
  a control signal for controlling said voice prompt generator based on whether said speech detector detects presence of speech energy in said second frequency band.

20. The remote device as recited in claim 19 further comprising:
  a back end of an interactive voice recognition system configured to operate on an extracted front end voice feature based on whether said speech detector detects presence of speech energy in said second frequency band.

21. The remote device as recited in claim 19 further comprising:
  means for providing a wireless communication link to a base station to communicate, an extracted front end voice feature, based on whether said speech detector detects presence of speech energy in said second frequency band, to a back end of an interactive voice recognition system configured to operate on said extracted front end voice feature.

* * * * *